United States Patent
Liu et al.

(10) Patent No.: US 11,941,057 B2
(45) Date of Patent: Mar. 26, 2024

(54) DEEP REPRESENTATION MACHINE LEARNED MODEL FOR HETEROGENEOUS INFORMATION NETWORKS

(71) Applicant: Microsoft Technology Licensing, LLC, Redmond, WA (US)

(72) Inventors: Zhanglong Liu, Fremont, CA (US); Ankan Saha, San Francisco, CA (US); Yiou Xiao, Sunnyvale, CA (US); Kathryn L. Evans, San Francisco, CA (US); Aastha Jain, Sunnyvale, CA (US); Aastha Nigam, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/830,067

(22) Filed: Jun. 1, 2022

(65) Prior Publication Data

US 2023/0394084 A1 Dec. 7, 2023

(51) Int. Cl.
*G06F 16/901* (2019.01)
*G06F 16/28* (2019.01)
*G06N 3/044* (2023.01)
*G06N 3/08* (2023.01)

(52) U.S. Cl.
CPC ........ *G06F 16/9024* (2019.01); *G06F 16/288* (2019.01); *G06N 3/044* (2023.01); *G06N 3/08* (2013.01)

(58) Field of Classification Search
CPC ... G06F 16/9024; G06F 16/288; G06N 3/044; G06N 3/08; G06N 3/045; G06N 20/00; G06N 7/00

USPC ......................................................... 707/798
See application file for complete search history.

(56) References Cited

U.S. PATENT DOCUMENTS

| | | | | |
|---|---|---|---|---|
| 2017/0140285 A1* | 5/2017 | Dotan-Cohen | ......... | G06F 9/453 |
| 2017/0186101 A1* | 6/2017 | Kapoor | .................. | G06Q 50/01 |
| 2020/0074246 A1* | 3/2020 | Goyal | ..................... | G06N 3/084 |
| 2021/0004682 A1* | 1/2021 | Gong | ....................... | G06N 3/08 |
| 2021/0312129 A1* | 10/2021 | Srinivasan | ............. | G06N 20/00 |

OTHER PUBLICATIONS

Fu, et al., "HIN2Vec: Explore Meta-paths in Heterogeneous Information Networks for Representation Learning", in Proceedings of the 2017 ACM on Conference on Information and Knowledge Management, Nov. 6, 2017, pp. 1797-1806.

(Continued)

*Primary Examiner* — Evan Aspinwall
(74) *Attorney, Agent, or Firm* — Schwegman, Lundberg & Woessner, P.A.

(57) ABSTRACT

In an example embodiment, a deep learning model is used to learn embedding representations of a heterogeneous information network, where the embedding represents entity-specific properties and network environment properties. Position-aware embeddings specific to the heterogeneous information network may be used as input features of the deep learning model. Furthermore, meta-path embedding specific to the heterogeneous information network may also be used as input features of the deep learning model. Modified embedding propagation methods are further designed to explore better ways to capture network meta-path properties.

20 Claims, 11 Drawing Sheets

(56) References Cited

OTHER PUBLICATIONS

Grover, et al., "node2vec: Scalable Feature Learning for Networks", in Repository of arXiv:1607.00653v1, Jul. 3, 2016, 10 Pages.

Hamilton, et al., "Inductive Representation Learning on Large Graphs", in repository of arXiv:1706.02216v1, Jun. 7, 2017, 18 Pages.

Hu, et al., "Leveraging Meta-path based Context for Top-N Recommendation with a Neural Co-Attention Model", in Proceedings of the 24th ACM SIGKDD International Conference on Knowledge Discovery & Data Mining, Jul. 19, 2018, pp. 1531-1540.

Shi, et al., "Heterogeneous Information Network Embedding for Recommendation", in repository of arXiv:1711.10730v1, Nov. 29, 2017, 14 Pages.

Ying, et al., "Graph Convolutional Neural Networks for Web-Scale Recommender Systems", in repository of arXiv:1806.01973v1, Jun. 6, 2018, 10 Pages.

\* cited by examiner

DEEP REPRESENTATION MACHINE LEARNED MODEL FOR HETEROGENEOUS INFORMATION NETWORKS

TECHNICAL FIELD

The present disclosure generally relates to technical problems encountered in machine learned models. More particularly, the present disclosure relates to using a deep representation machine learned model for heterogeneous information networks.

BACKGROUND

Social networking services are online platforms that people use to build social networks or social relations with other people. Heterogeneous information networks may be utilized in such networks to capture and relate disparate data. A heterogenous information network is a semi-structured data structure, typically in the form of a graph, where nodes of the graph can be of multiple different node types representing different categories of data. For example, in a social networking service, a heterogeneous information network may contain a graph having some nodes representing users and some nodes representing web pages hosted by the social networking service. There may also be multiple different types of connections (edges) between nodes, each representing a different type of interaction or relationship between the entities represented by the nodes on each end of the connection. For example, there may be a first type of connection between a user node and a web page node indicating the user visited the web page and another type of connection indicating the user shared the contents within the web page with another user.

It can often be useful to use such graphs to aid in the determination of content to present to users. For example, in recent years it has become popular for social networking services to provide feeds to users, where updates or items of interest can be presented to users who have logged into the service. The feed may contain, for example, indications that a social networking connection for a user has been promoted, has changed jobs, and so forth. The feed may also contain articles of interest to the user, either because they have some connection to one or more of the user's social networking connections (e.g., an article written by a friend) or because they are linked to an area of interest for the user, as identified by the social network service (e.g., the article is on a subject the user has identified as an area of interest in their user profile).

It can be challenging for the social networking service to determine which of many potential items should be displayed in the feed and the order in which they should be displayed. This is typically handled via one or more machine learning algorithms implemented by the social networking service for selection and ranking of potential items to display. Similar algorithms may be used for dynamic user interfaces, which may alter available actions on a screen based on the likelihood that a user will select those actions. For example, if a user is unlikely to share a video, then a "share video" button may be removed from a main screen of a user interface and replaced with a button for a different action the user may be more likely to perform. The "share video" button may be moved to a secondary screen that is more difficult to access.

Whether for feed ranking or dynamic user interface adjustment, these algorithms are based on determining the likelihood that the user will interact with the item in some way (e.g., select it, share it, like it, etc.). This determination is typically performed by a machine-learned model trained by a machine learning algorithm. Such machine-learned models, however, are limited in that they fail to capture network properties beyond the second degree (i.e., nodes more than two connections away from a node under consideration). Such machine-learned models also depend on manually engineered network features.

BRIEF DESCRIPTION OF THE DRAWINGS

Some embodiments of the technology are illustrated, by way of example and not limitation, in the figures of the accompanying drawings.

DETAILED DESCRIPTION

Overview

Figure 1:
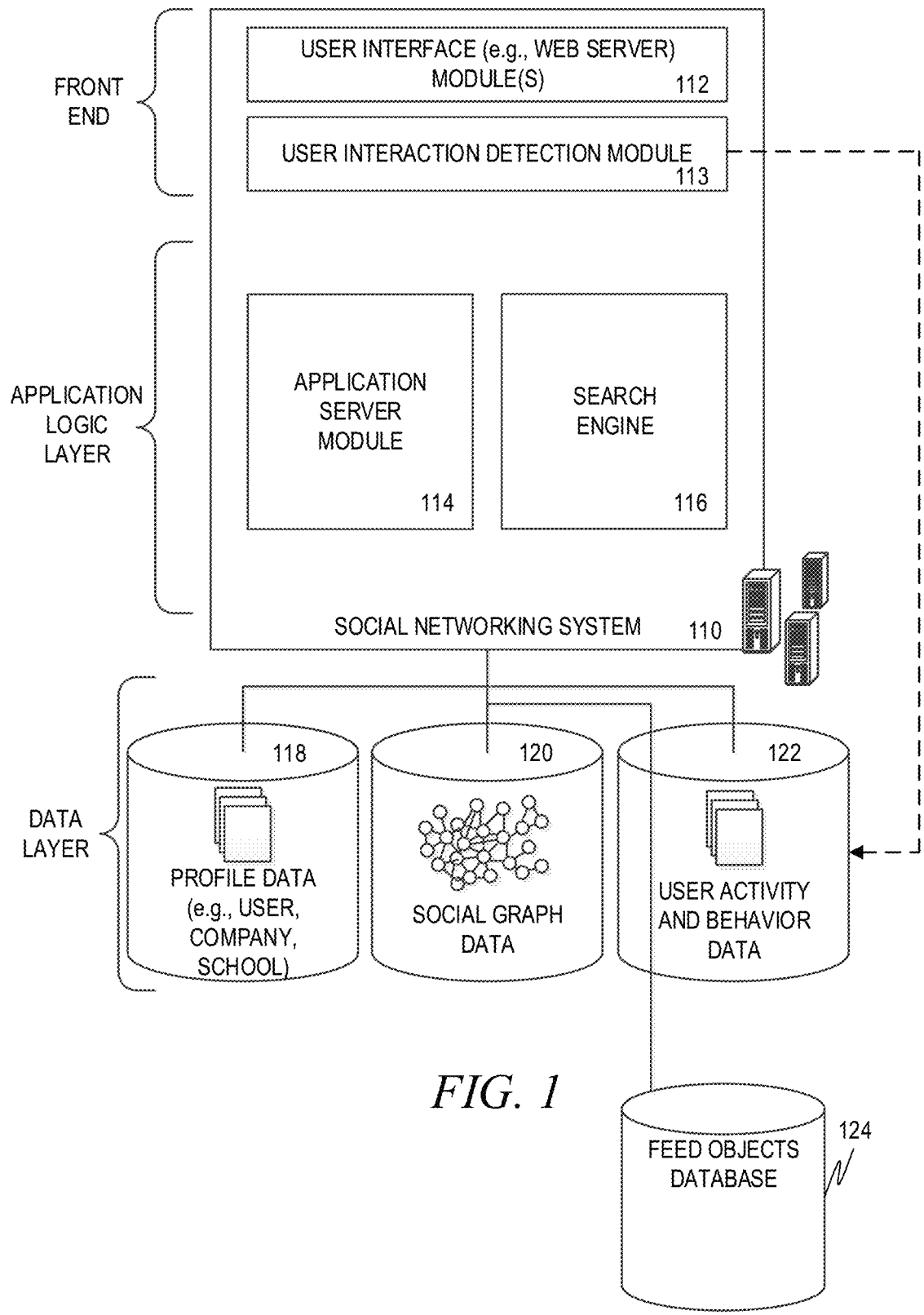
FIG. 1 is a block diagram showing the functional components of a social networking service, including a data processing module referred to herein as a search engine, for use in generating and providing search results for a search query, consistent with some embodiments of the present disclosure.

In an example embodiment, a deep learning model is used to learn embedding representations of a heterogeneous information network, where the embedding represents entity-specific properties and network environment properties. Position-aware embeddings specific to the heterogeneous information network may be used as input features of the deep learning model. Furthermore, meta-path embedding specific to the heterogeneous information network may also be used as input features of the deep learning model. Modified embedding propagation methods are further designed to explore better ways to capture network meta-path properties.

In an example embodiment, the deep learning model is a hierarchical deep neural network model used to predict future interaction between users and other nodes (such as pages, or even other users) in the heterogeneous information network. User and page embeddings may be generated by the deep models from the user and page side, respectively.

In some example embodiments, the hierarchical deep neural network model includes a two-tower model. The two-tower model comprises two encoder towers: a user tower and a page tower. Essentially, each encoder tower is its own deep neural network, whose output gets combined in the larger deep neural network. The user tower and the page tower embed users and pages (respectively) into a low-dimensional space, and the larger deep neural network is then able to predict interactions between the two via the geometrical relationship of the embeddings of in the embedded space.

Description

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a deep learning model is used to learn embedding representations of a heterogeneous information network, where the embedding represents page-specific properties and network environment properties. The deep learning model is then used to predict future interactions among nodes in the heterogeneous information network, such as interactions between users and pages, or interactions between users and other users.

It should be noted that example embodiments will be described throughout this document describing the prediction of user interactions with pages, and the prediction may be called a "user-to-page-score" (U2PS), which may then be used to determine content to present to a corresponding user, in the context of a feed. Nevertheless, the methods and systems described herein can be applied to any nodes in a heterogeneous network (not just limited to users and pages) and can be used to predict interactions, affinity, or any other connection among the nodes (not just limited to feed environments). Nothing in this document shall be construed as limiting the scope of this disclosure to user-to-page connections or feed environments, unless expressly claimed.

FIG. 1 is a block diagram showing the functional components of a social networking service, including a data processing module referred to herein as a search engine, for use in generating and providing search results for a search query, consistent with some embodiments of the present disclosure.

As shown in FIG. 1, a front end may comprise a user interface module 112, which receives requests from various client computing devices and communicates appropriate responses to the requesting client devices. For example, the user interface module(s) 112 may receive requests in the form of Hypertext Transfer Protocol (HTTP) requests or other web-based Application Program Interface (API) requests. In addition, a user interaction detection module 113 may be provided to detect various interactions that users have with different applications, services, and content presented. As shown in FIG. 1, upon detecting a particular interaction, the user interaction detection module 113 logs the interaction, including the type of interaction and any metadata relating to the interaction, in a user activity and behavior database 122.

An application logic layer may include one or more various application server modules 114, which, in conjunction with the user interface module(s) 112, generate various user interfaces (e.g., web pages) with data retrieved from various data sources in a data layer. In some embodiments, individual application server modules 114 are used to implement the functionality associated with various applications and/or services provided by the social networking service.

As shown in FIG. 1, the data layer may include several databases, such as a profile database 118 for storing profile data, including both user profile data and profile data for various organizations (e.g., companies, schools, etc.). Consistent with some embodiments, when a person initially registers to become a user of the social networking service, the person will be prompted to provide some personal information, such as his or her name, age (e.g., birthdate), gender, interests, contact information, home town, address, spouse's and/or family users' names, educational background (e.g., schools, majors, matriculation and/or graduation dates, etc.), employment history, skills, professional organizations, and so on. This information is stored, for example, in the profile database 118. Similarly, when a representative of an organization initially registers the organization with the social networking service, the representative may be prompted to provide certain information about the organization. This information may be stored, for example, in the profile database 118 or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the social networking service. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 120.

As users interact with the various applications, services, and content made available via the social networking service, the users' interactions and behavior (e.g., content viewed, links or buttons selected, messages responded to, etc.) may be tracked, and information concerning the users' activities and behavior may be logged or stored, for example, as indicated in FIG. 1, by the user activity and behavior database 122. This logged activity information may then be used by a search engine 116 to determine search results for a search query.

Although not shown, in some embodiments, a social networking system 110 provides an API module via which applications and services can access various data and services provided or maintained by the social networking service. For example, using an API, an application may be able to request and/or receive one or more recommendations. Such applications may be browser-based applications or may be operating system-specific. In particular, some applications may reside and execute (at least partially) on one or more mobile devices (e.g., phone or tablet computing devices) with a mobile operating system. Furthermore, while in many cases the applications or services that leverage the API may be applications and services that are developed and maintained by the entity operating the social networking service, nothing other than data privacy concerns prevents the API from being provided to the public or to certain third parties under special arrangements, thereby making the navigation recommendations available to third-party applications and services.

Although the search engine 116 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 116 facilitates the indexing and searching for content within the social networking service, such as the indexing and searching for data or information contained in the data layer, such as profile data (stored, e.g., in the profile database 118), social graph data (stored, e.g., in the social graph database 120), and user activity and behavior data (stored, e.g., in the user activity and behavior database 122). The search engine 116 may collect, parse, and/or store data in an index or other similar structure to facilitate the identification and retrieval of information in response to received queries for information. This may include, but is not limited to, forward search indexes, inverted indexes, N-gram indexes, and so on.

A feed objects database 124 may contain objects that can be displayed in feeds of one or more users of the social networking service. A feed is a data format used for providing users with frequently updated content. In the social networking service, users may view their feed when they, for example, log into the social networking service. The feed contains one or more objects that the social networking service believes may be of interest to the user. The user feed may contain items from different categories, e.g., job postings, user postings, suggestions for new connections, sponsored posts, etc. Creating the feed means ranking the items from the different categories, merging the items from the different categories, and creating the user feed, which presents the items in sequential order.

Figure 2:
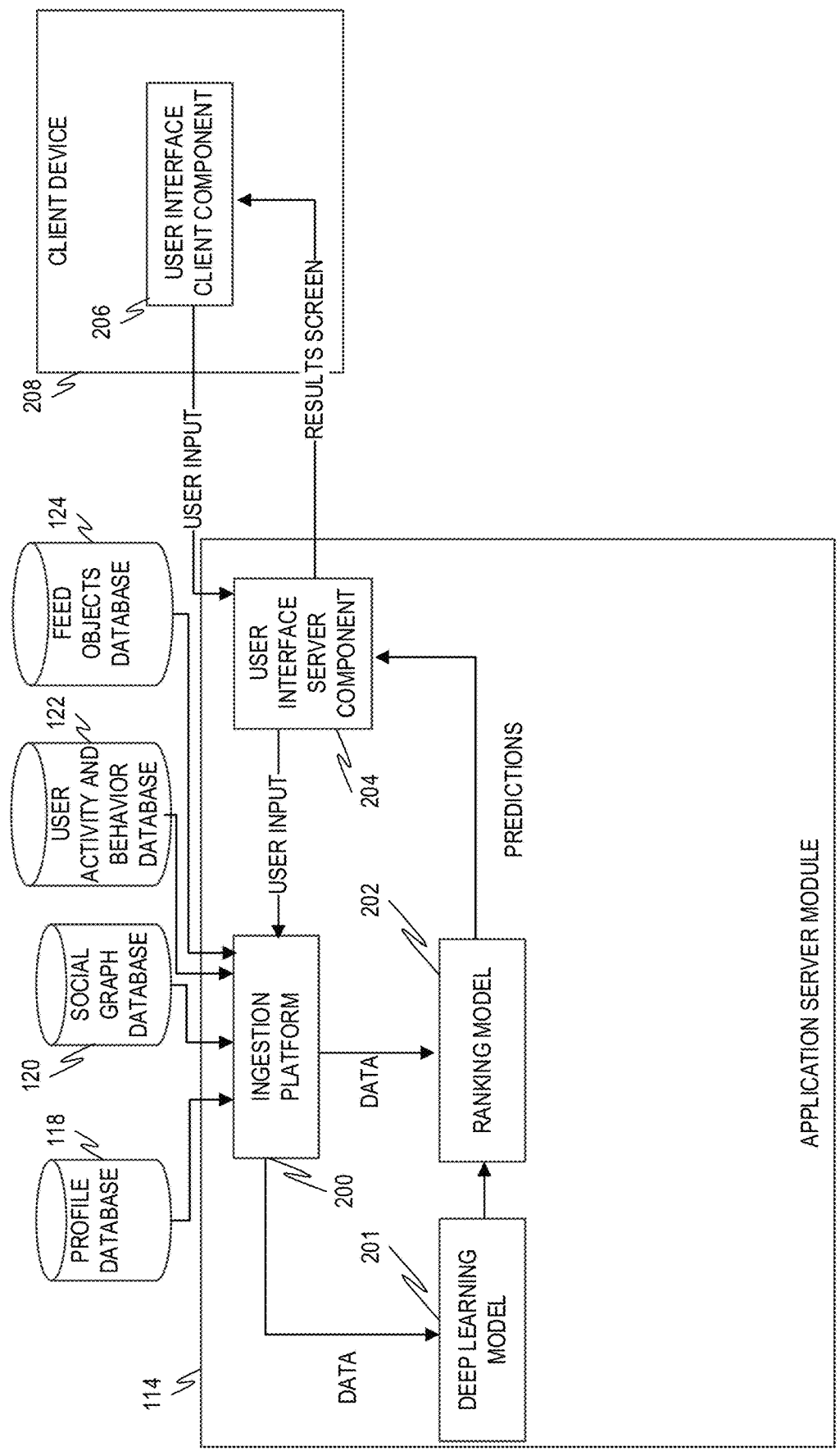
FIG. 2 is a block diagram illustrating the application server module of FIG. 1 in more detail, in accordance with an example embodiment.

FIG. 2 is a block diagram illustrating the application server module 114 of FIG. 1 in more detail, in accordance with an example embodiment. While in many embodiments the application server module 114 will contain many subcomponents used to perform various actions within the social networking system 110, only those components that are relevant to the present disclosure are depicted in FIG. 2.

Here, an ingestion platform 200 obtains information from the profile database 118, the social graph database 120, the user activity and behavior database 122, and/or the feed objects database 124 relevant to a ranking model 202. At training time, the ingestion platform 200 sends this information to deep learning model 201. Either in conjunction with this, or separately, the ingestion platform 200 sends the information to the ranking model 202 in order to train the ranking model 202. At prediction time, such as when a social networking service needs to determine which feed objects to present to a particular user and in what order, the ingestion platform 200 sends information corresponding to the particular user and one or more items being examined to deep learning model 201.

In some example embodiments, this information is transmitted in the form of feature vectors. For example, each user profile may have its own feature vector formed of the information in the profile database 218, the social graph database 220, and the user activity and behavior database 222.

The concept of feature is related to that of an explanatory variable used in statistical techniques such as linear regression. Choosing informative, discriminating, and independent features is important for effective operation of the machine learning algorithm in pattern recognition, classification, and regression. Features may be of different types, such as numeric, strings, and graphs.

In one example embodiment, the features may be of different types and may include one or more of user features, content features, and item features. The user features may include one or more of the data in the user profile, as described in FIG. 1, such as title, skills, endorsements, experience, education, a number of connections the content creator has via the online social networking service, a number of active connections the content creator has via the online social networking service, identifiers of profile features, an identifier of language preference, a job seniority, a gender, a student identifier, a job seeker identifier, a recruiter identifier, and the like. The content features may include any data related to various content items (e.g., a number of content items the content creator generated previously, types of activities that the content creator has engaged in previously, past session data, past sharing data, one or more identifiers of sources of content that the content creator shared, an indicator that shared content included at least one of an image, rich media, or a hashtag, or a number of notifications received by the content creator). The item features may include any data related to various items, such as item type, category, topics, frequently mentioned terms, authors, and so forth.

A user interface server component 204 communicates with a user interface client component 206 located on a client device 208 to run the ranking model 202 and use its results to display or update a feed to a user. This may be performed in response to a user input, such as a navigation input to a web page that includes the feed. For example, a user could instruct the user interface client component 206 to log into a social networking service account. This log-in information could then be sent to the user interface server component 204, which can use this information to instruct the ingestion platform 200 to retrieve the appropriate information from the profile database 118, the social graph database 120, the user activity and behavior database 122, and/or the feed objects database 124.

The results from the ranking model 202 could then be sent to the user interface server component 204, which, along with the user interface client component 206, could select and format appropriate feed objects for display to the user. Details about how these objects could be displayed on the client device 208 via the user interface client component 206 will be described in more detail below.

Figure 3:
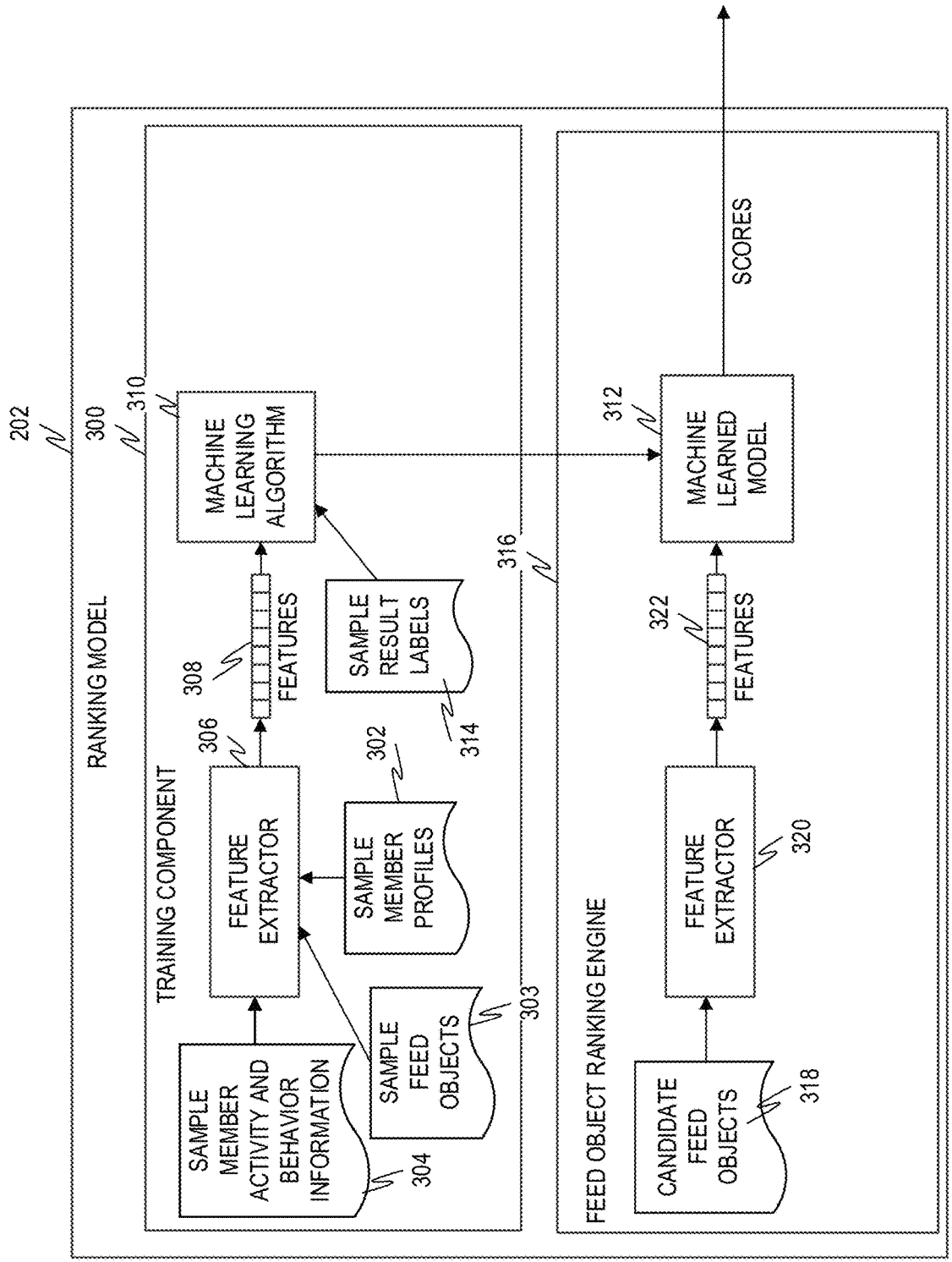
FIG. 3 is a block diagram illustrating the ranking model of FIG. 2 in more detail, in accordance with an example embodiment.

FIG. 3 is a block diagram illustrating the ranking model 202 of FIG. 2 in more detail, in accordance with an example embodiment. In a training component 300, sample user (e.g., member) profiles 302, sample feed objects 303, and/or sample user activity and behavior information 304 are fed to a feature extractor 306, which acts to extract curated features 308 from the sample user profiles 302, sample feed objects 303, and/or sample user activity and behavior information 304. A feature is a variable pertaining to an input piece of data. Since the input may, in some example embodiments, be data related to a user of a social networking service, such as a user profile, user usage and/or activity data, or social graph information, the feature may be, for example, a portion of the user profile, user usage and/or activity data, or social graph. The feature may also be a variable calculated from a portion of the data, such as an average, sum, difference, measurement, and so forth. The feature may also be some aspect of the sample feed objects, such as title, frequently appearing terms, and/or various metrics about the object, such as frequency of occurrence of key words.

In an example embodiment, the curated features 308 are then used as input to a machine learning algorithm 310 to train a machine learned model 312 to generate a probability that a feed object should be displayed to a particular user. While this probability may be based on the likelihood that the user may interact in some way with the feed object, as will be described in more detail below, it may also be based on the effect of viral actions by the user or downstream users, as well as the relative value of these effects on the social networking service as a whole. In certain types of machine learning algorithms, the training may include providing sample result labels 314 to the machine learning algorithm 310. Each of these sample result labels 314 is a score indicating a likelihood that a corresponding sample feed object should be displayed to a user.

The machine learning algorithm 310 may be selected from among many different potential supervised or unsupervised machine learning algorithms. Examples of supervised machine learning algorithms include artificial neural networks, Bayesian networks, instance-based learning, support vector machines, random forests, linear classifiers, quadratic classifiers, k-nearest neighbor, decision trees, and hidden Markov models. Examples of unsupervised machine learning algorithms include expectation-maximization algorithms, vector quantization, and information bottleneck methods. In an example embodiment, a binary logistic regression model is used. Binary logistic regression deals with situations in which the observed outcome for a dependent variable can have only two possible types. Logistic regression is used to predict the odds of one case or the other being true based on values of independent variables (predictors).

In a feed object ranking engine 316, candidate feed objects 318 are fed to a feature extractor 320, which acts to extract curated features 322 from the candidate feed objects 318. The curated features 322 are then used as input to the machine learned model 312, which outputs a score indicating the likelihood that the corresponding candidate feed objects 318 should be displayed in the feed.

In an example embodiment, the machine learned model 312 is trained in such a manner that it is able to output a score for each potential feed item.

Figure 4:
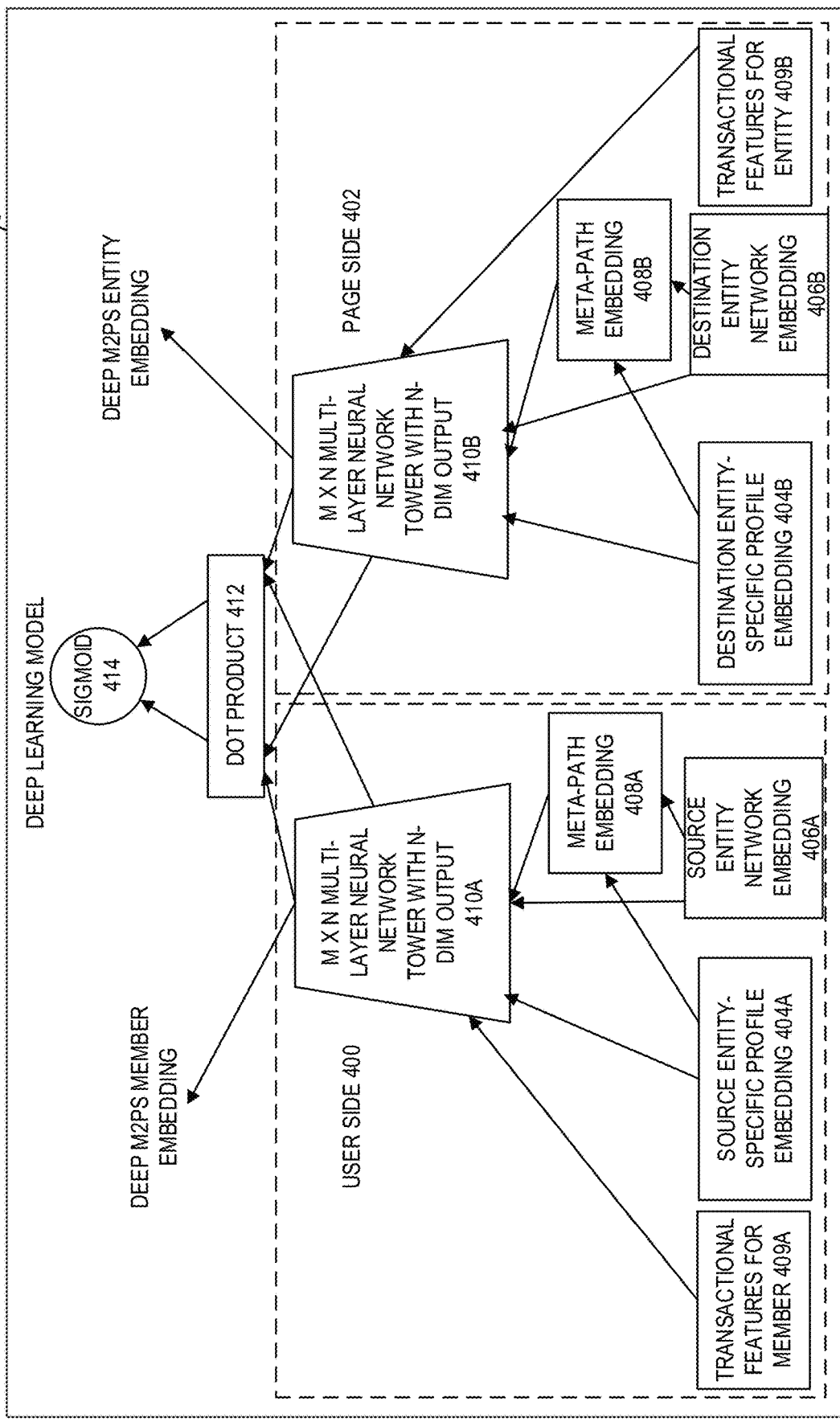
FIG. 4 is a block diagram illustrating the deep learning model of FIG. 2 in more detail, in accordance with an example embodiment.

FIG. 4 is a block diagram illustrating the deep learning model 201 of FIG. 2 in more detail, in accordance with an example embodiment. As described briefly earlier, in an example embodiment, the deep learning model 201 is a hierarchical deep neural network model having embeddings generated by a user side 400 and a page side 402 of a two tower model.

Learning embeddings is a process whereby each item to be embedded is assigned a different set of coordinates in an n-dimensional space. Each of these sets of coordinates is considered a different embedding. The relationships between the sets of coordinates in the n-dimensional space is representative of the similarity of respective items—for example if two entities or user-page pair are embedded to coordinates that are closer to each other in the n-dimensional space, this is indicative that the users are similar to each other, whereas users embedded to coordinates that are further from each other in the n-dimensional space is indicative that the users are dissimilar to each other. Similarity is based on the labels of the training data used to train the embedding function, which may be its own machine learned model for each type of embedding.

Within a neural network tower (either user or page), entity-specific profile embeddings 404A, 404B, entity network embeddings 406A, 406B, and meta-path embeddings 408A, 408B are used as input features. Here, the user side 400 is shown with source embeddings while the page side 402 is shown with destination embeddings. Source, in this context, refers to the entity that is an origin of a connection while destination refers to the entity that is an endpoint of a connection. Entity, in this context, refers to the node being examined (whether user, webpage (e.g., company webpage), article, content, or other). Thus, here, a user originates a connection to a page, such as by interacting with the page. Interacting with the page, however, as described earlier, is not always the case. Connections are possible between users and other users, or from pages to users, and don't always reflect an interaction but can reflect some other type of connection. Nevertheless, in the user-page embodiment, the entity-specific profile embeddings 404A, 404B may be standardized user/page embeddings.

Additionally, with independent entity tower, entity embeddings (e.g. member embeddings and page embeddings) could be generated and they are serving as important input features for other machine learning model. Some example machine learning use cases are Feed Relevance Ranking model, Notification (click probability) pClick model, Follow Recommendation model. For a typical user-page interaction network, hundreds millions of users and tens millions of pages, a complete calculation of U2P score is impossible (hundred million times tens million operations). With generated embedding for each member (hundred million operations/calculations) and each page (tens million operations/calculations), the U2P score could be generated by just dot product and sigmoid function for each request. With the current embedding approach, cold start problem with machine learning ranking algorithm could be partially resolved for user-page pairs without any interaction or connection before.

One advantage of the deep learning model 201 is that it could leverage the rich heterogeneous information network information by extracting the embedding representation from the meta-path of the graph (such as a member-page interaction network). Before that meta-path can be modeled, however, a prerequisite step is to create an efficient representation to model the entity (user, page, or otherwise) within the network. These are the entity network embeddings 406A, 406B. One approach to doing so would be to use "one-hot" encoding for all entities in the network. One-hot encoding is a representation of categorical variables as binary vectors. Each integer value is represented as a binary vector that is all zero values except the index of the integer, which is marked with a 1. One issue with one-hot encoding is that while it works well for small networks, it does not work as well for larger networks. It is computationally expensive for each step in training and scoring, and this expense is only made worse by adding in different types of entities, such as pages, hashtags, and articles/posts.

In an example embodiment, a modified one-hot encoding approach is utilized. This modified one-hot encoding approach may be known as position-aware embedding, and it includes modulo and anchor embedding. Briefly, a user's modulo embedding is a one-hot vector of the remainder of a user identification after a modulo operation is performed, while an anchor embedding is created through propagation of the representatives' one-hot embedding in the network.

For modulo embedding, in an example embodiment, a user modulo embedding, with $N_m$ as a prime divisor and page modulo embedding with $M_m$ as a prime divisor, are generated independently. They are then concatenated together to form a modulo embedding with a dimensionality of $N_m+M_m$. Each type of entity is distributed in different dimensions of the feature space.

For anchor embedding, Na users and Ma pages with strong, moderate, or week user-to-page (U2PS) score scores may be randomly selected separately to form network representatives. With strong U2PS scores, the representative entities are highly likely to be the active nodes within the network. For moderate and weak U2PS scores, the situation is opposite.

Figure 5:
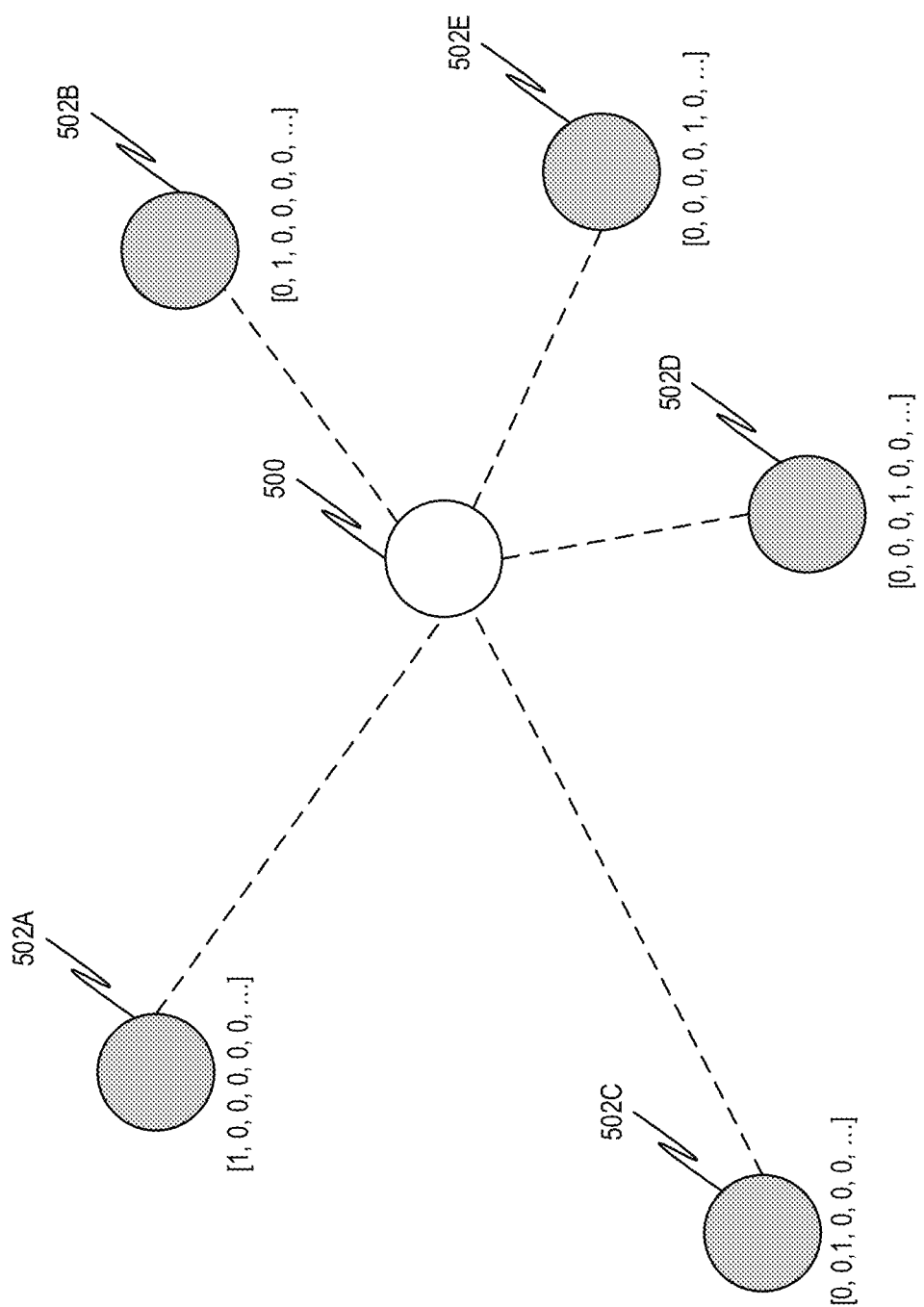
FIG. 5 is a block diagram illustrating an anchor embedding, in accordance with an example embodiment.

FIG. 5 is a block diagram illustrating an anchor embedding, in accordance with an example embodiment. The anchor embedding of an entity 500 is calculated based on the one-hot embedding of the shaded representatives 502A-502E.

Turning to the meta-path embeddings 408A, 408B, the meta-path is used to extract rich information inside the heterogeneous information network, and different meta-paths could reveal distinguished properties. For example, "UP" (U" User, P:Page) is the direct and first-degree interaction. UUP and UPP are the weaker second-degree meta-paths. There are multiple ways to model the meta-path, such as meta-path relationship vector in HIN2vect, a skip-gram design along the meta-path in node2vec, etc. In an example embodiment, however, a deep-CCX approach is used, where meta-path embeddings are generated by mean-pool propagation in networks. An example of direct meta-path is $U_{src}UUP_{dest}$ and an example of indirect meta-path is $U_{src}U$-(no edge between)-$UP_{dest}$.

Figure 6:
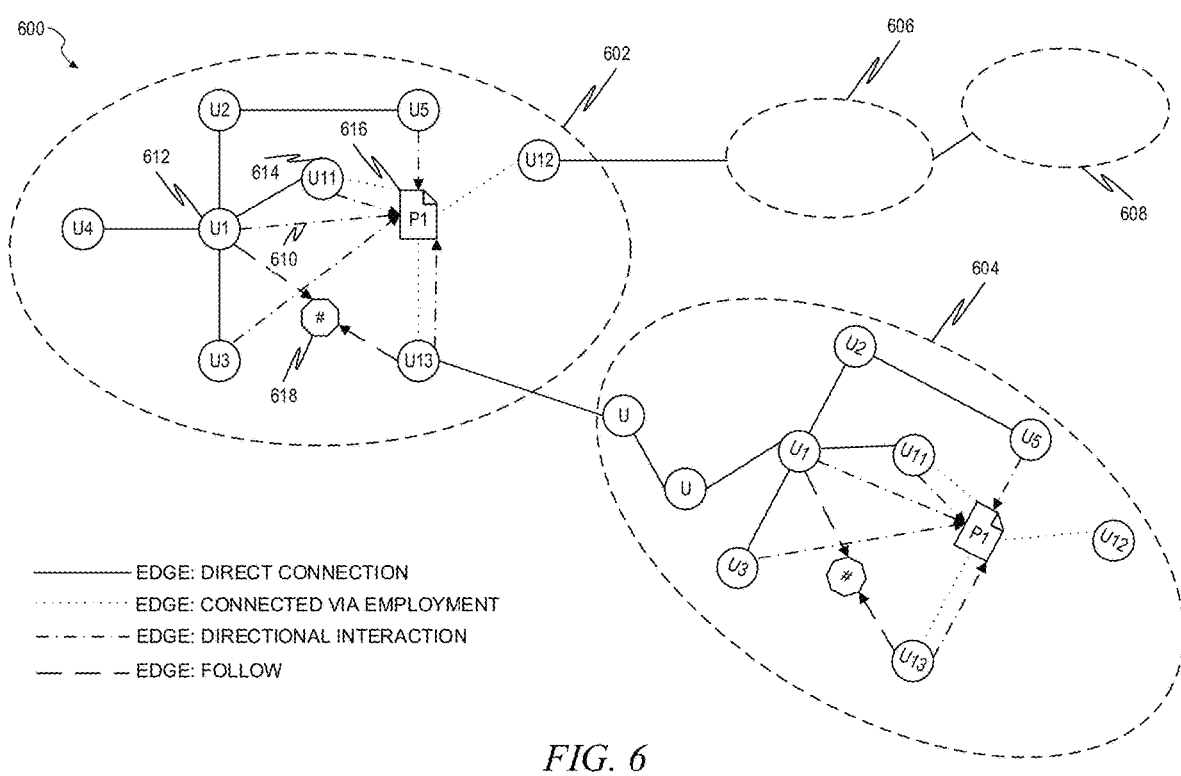
FIG. 6 is a block diagram illustrating a user-page interaction network, in accordance with an example embodiment.

FIG. 6 is a block diagram illustrating a user-page interaction network 600, in accordance with an example embodiment. Each local user-page interaction network is included in an ellipse 602, 604, 606, 608. Thus, user-page interaction network 600 may include various users, such as users 612 and 614 who are connected to one another as well as to a page P1 616 and to a hashtag 618. Additionally, a proper user-page interaction network may be designed as the label (or model objective) of a deep M2PS model. There are multiple approaches which may be taken.

One approach is a user-page interaction network (I-network). Here, the I-network may be constructed first with, for example, user connection data, user employment data, user-page interaction data, including feed viral actions, page view actions, job actions, and ads actions. Two embeddings can be generated from two-step propagation.

In an example embodiment, three mean-pool propagation are used. With the user-page interaction network, there may be three types of propagation. User-to-user and page-to-user propagations capture the user surroundings in terms of first degree of connection and interacted pages. User-to-page propagation captures the page surroundings. Since there is no direct connection between pages, there is no need to perform propagation among them. The meta-path embeddings can include up to one hop-away effects either from the source or from the destination entities, which represent both direct (with interaction edge between source meta-path and destination meta-path) and indirect (without edge between) meta-paths. An example of direct meta-path is $M_{src}MMM_{dest}$ and an example of indirect meta-path is $M_{src}M$-(no edge between)-$MM_{dest}$.

The second is a modified user-page interaction network (modified I-network). The modified I-network is the same as the I-network except that it can be assumed that the interaction edge between the user and the page is bidirectional. The intuition for this treatment is that the interaction not only indicates the user's interest in the page but also the page's interest in the user (potentially more engaged followers, for example). With the modified I-network, the page meta-path embedding could be generated through more user entities, employees, and engaged members. Thus, for example, in FIG. 6, even though the edge 610 between User U1 612 and Page P1 616 is unidirectional, it may be assumed that the edge is bidirectional during propagation.

The third is a contextualized (private|public) user-page interaction network. For the label, two types of interaction networks may be constructed, including the private and public I-network. They are similar to the I-network except that the interactions are divided into private and public contexts.

While mean-pool propagation simplifies the meta-path embedding calculation, it may lose lots of network information around source and destination entities. For example, one may not be able to discern the type of the meta-path or the entities along the meta-path by using the aggregation. Second-degree effects are important for the deep learning model, however. Additionally, the meta-path is designed to encode the rich network information. Although the user profile embedding and page embedding might indicate some potential factors in establishing the connection, they are not designed to encode the network information.

There are other designs to construct the meta-path, including a different original embedding to propagate, networks with different time windows, and non-aggregate meta-path embedding. In one such design, the meta-path embedding is generated using the position-aware embedding only (and not the rich network information/effects). In another such design, the I-network is propagated in different times. This reflects the fact that the user-page interaction network is continuously evolving. For example, for two consecutive months, only 15% of the interaction edges may be stable. To model this dynamic nature, the propagation may be embedded with interaction networks in different time windows. By using, for example, a 1-month aggregation window, it is more likely to have a transient interaction heterogeneous information network, while a 1-year aggregation window would make the heterogeneous information network more stable.

In another such design, $2^{nd}$-degree and $3^{rd}$-degree entity embeddings (randomly selected top K representatives) along the meta-path between the head U and the tail P may be explored as deep features.

Due to the above proximations, such as position-aware embedding and mean-pool approximation, some of the detailed interaction information might be diminished. Additionally, the member-entity interaction pair features are important in the model. In an example embodiment, a transformational interaction feature, the transactional feature, is designed to capture some of the essential dynamic nature of the interaction network for each entity type. For member transactional features, the number of entities for each type of the actions are aggregated within multiple time windows. For entity transactional features, a similar aggregation may be performed for the number of members regarding each action type and each time window.

Referring back to FIG. 4, the meta-path embeddings (408A from the user side 400, 408B from the page side 402) and transactional features for members and entity (409A, 409B, respectively) are fed to the M×N multi-layer neural network towers with N-dim output 410A, 410B (respectively), which also take as input the source/destination entity-specific profile embeddings (404A, 404B, respectively) and source/destination entity network embeddings 406A, 406B.

Figure 7:
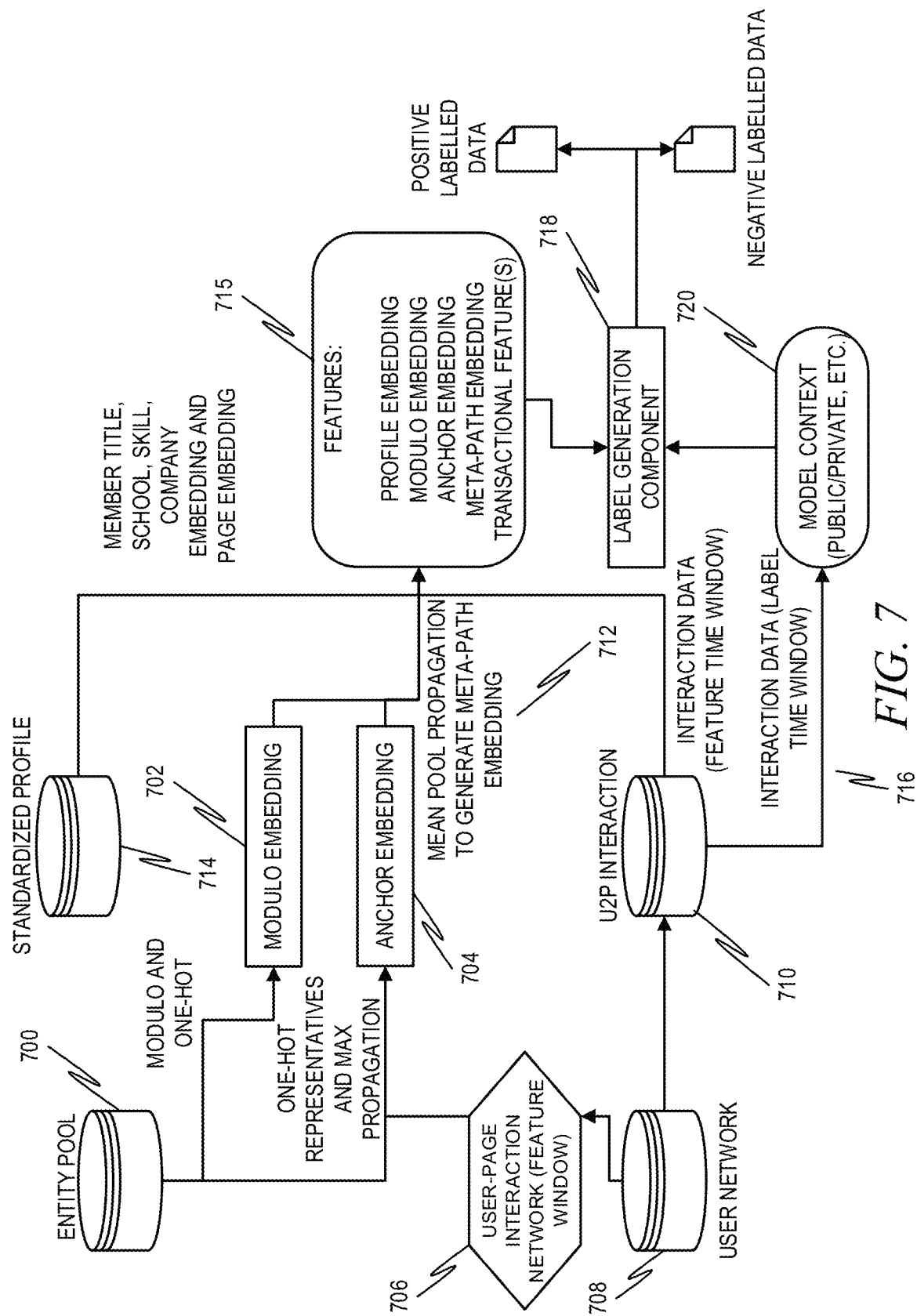
FIG. 7 is a diagram illustrating generation of training data for the deep learning model, in accordance with an example embodiment.

FIG. 7 is a diagram illustrating generation of training data for the deep learning model 201, in accordance with an example embodiment. Information from an entity pool 700 (including user and page information) may be used in both modulo embedding 702 and anchor embedding 704. Also included in the anchor embedding 704 is data from a user-page interaction network 706 (in a feature window) from a user network 708 including connections. Those same connections may also be used to create a user-to-page interaction data store 710. Mean pool propagation 712 may be used to generate meta-path embedding from the user-page interaction network 706, and these embeddings, as well as profile embeddings from a standardized profile 714, the modulo embedding 702, and the anchor embedding 704 may constitute features 715 of the training data.

Interaction data 716 may then be used by a label generation component 718 (either with or without model context 720, such as private/public, information) to generate labels for each user-page combination of features 715. Specifically, if the user interacted with the page, then a positive label is applied to the user-page combination of features 715. If not, then a negative label is applied. This labeled set of user-page combinations of features 715 can then be used to train the deep learning model 201.

The model objective is to try and predict the future interaction or affinity between entities, such as between a user and a page, using historical data. To model the problem, two consecutive time windows may be used to create the graph, which represents the feature and model label. In an example embodiment, this information does not overlap with the future time window to prevent information leakage. More particularly, a feature time window of interaction data is one of the consecutive windows while a label time window of interaction data is the other of the consecutive windows. The label generation component 718 then predicts the future edges for the graph based on the past edges for the graph.

Figure 8:
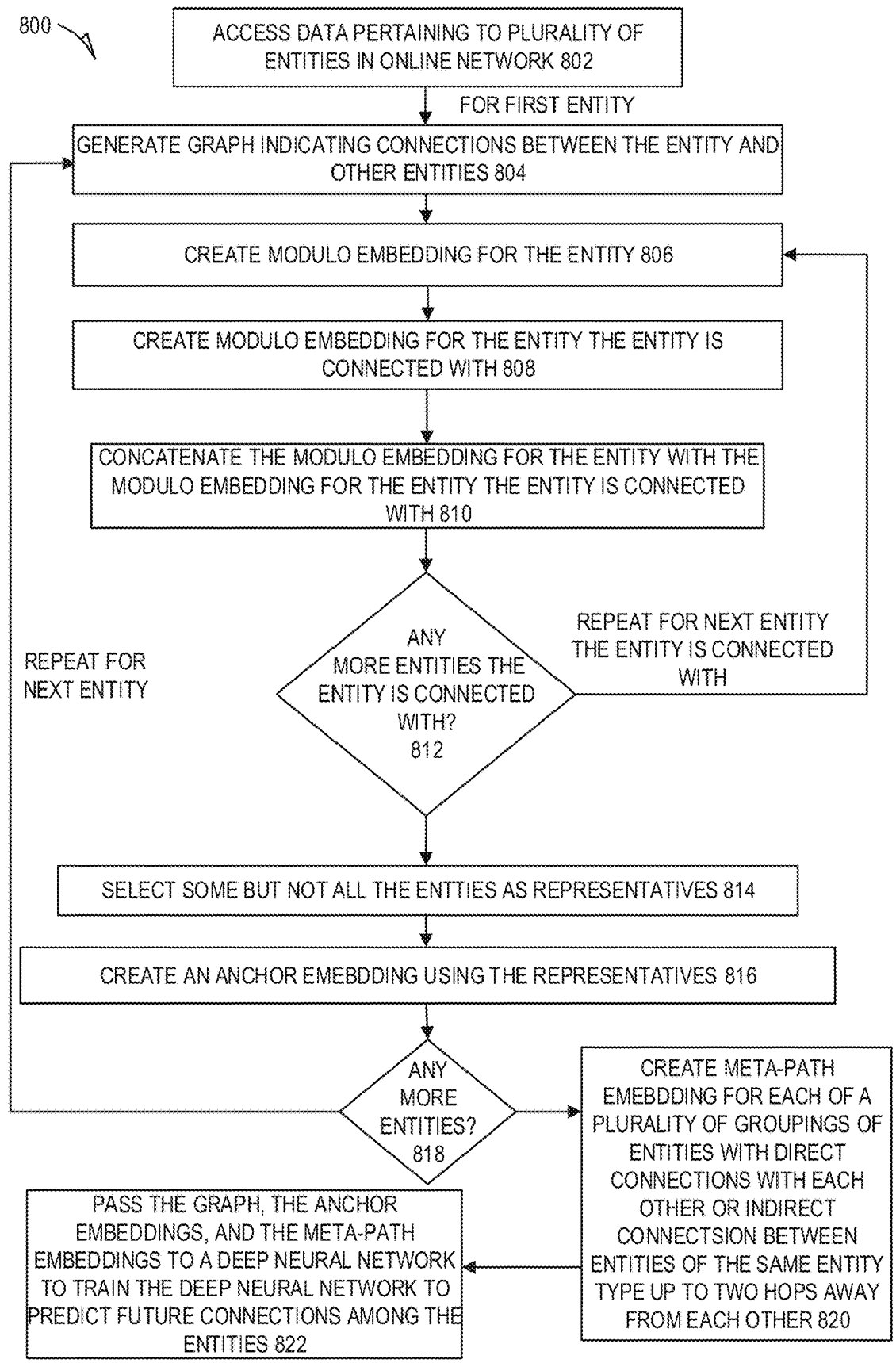
FIG. 8 is a flow diagram illustrating a method for accessing data pertaining to a plurality of entities in an online network, in accordance with an example embodiment.

FIG. 8 is a flow diagram illustrating a method 800 for accessing data pertaining to a plurality of entities in an online network, in accordance with an example embodiment. The data includes information about connections among the entities, the data including information about entities of multiple entity types. At operation 802, data pertaining to a plurality of entities in an online network is accessed, the data including information about connections among the entities, the data including information about entities of multiple entity types.

A loop is then begun for each entity to which the data pertains. At operation 804, a graph indicating the connections between the entity and other entities in the online network is generated. Then another loop is begun for each entity in the data that the entity is connected to. At operation 806, a modulo embedding for the entity is created. At operation 808, a modulo embedding for the entity the entity is connected to is created. At operation 810, the modulo embedding for the entity is concatenated with the modulo embedding for the entity the entity interacted with. At operation 812, it is determined if there are any more entities the entity is connected with. If so, then the method 800 loops back to operation 806 for the next entity the entity is connected to.

If it is determined that there are no more entities the entity is connected with, then at operation 814, some but not all of the entities are selected as representatives. At operation 816, an anchor embedding is created using the representatives. At operation 818, it is determined if there are any more entities in the data. If so, then the method 800 loops to operation 804 for the next entity.

If not, then at operation 820, a meta-path embedding is created for each of a plurality of groupings of entities with direct connections with each other or indirect connections between entities of a same entity type up to two hops away from each other in the connections. Then, at operation 822, the graph, the anchor embeddings, and the meta-path embeddings are passed to a deep neural network to train the deep neural network to predict future connections among the entities.

Figure 9:
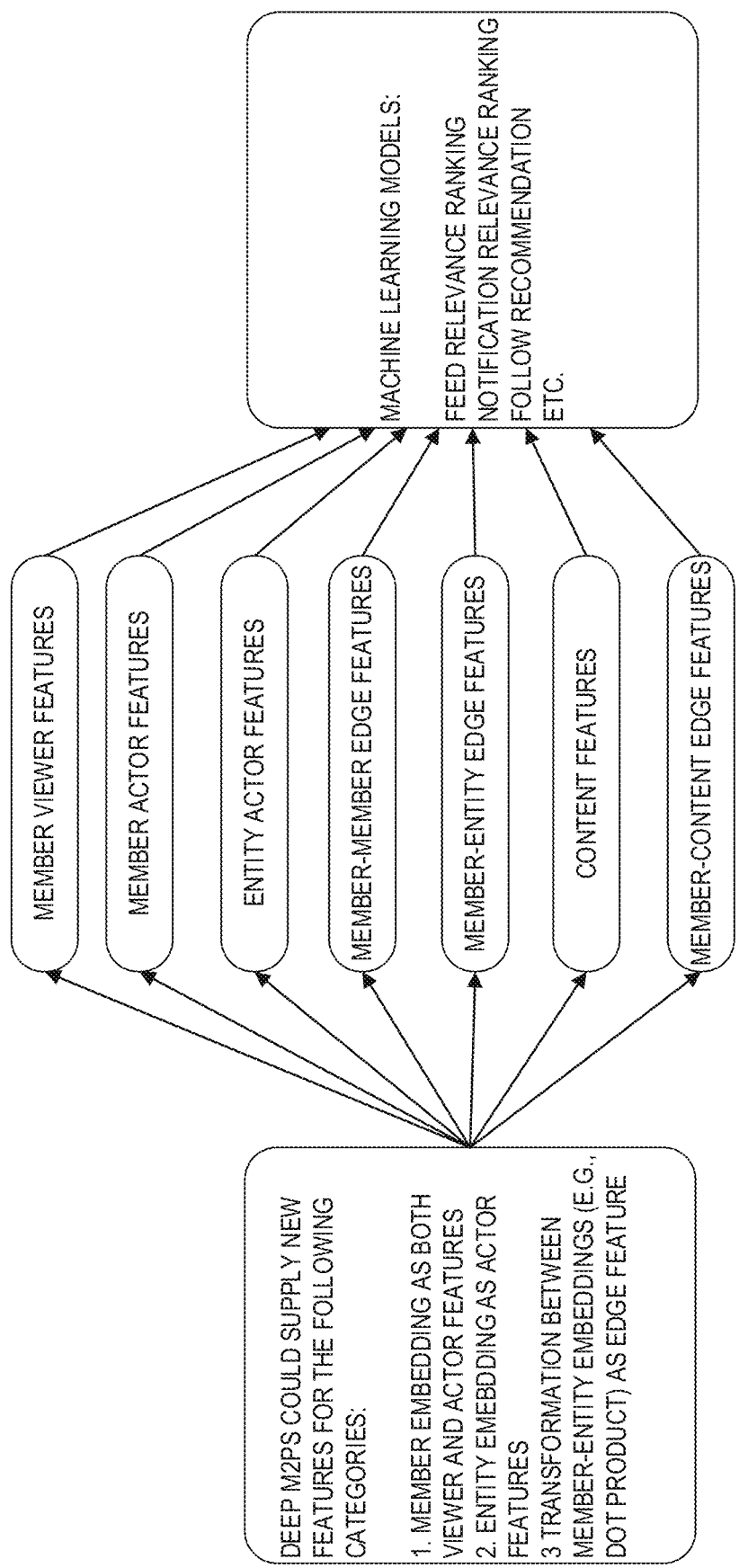
FIG. 9 is a block diagram illustrating use cases of deep-M2PS member embedding and deep-M2PS entity embedding, in accordance with an example embodiment.

FIG. 9 is a block diagram illustrating use cases of deep-M2PS member embedding and deep-M2PS entity embedding, in accordance with an example embodiment.

It should also be noted that in some example embodiments, the deep learning model (deep-M2PS) could generate two entity embeddings, each with private and public contexts (e.g. deep-M2PS user embedding with public context, deep-M2PS user embedding with private context, deep-M2PS page embedding with public context, and deep-M2PS page embedding with private context).

The generated entity embeddings could be used as input feature in other machine learning model in the social network application, e.g. Feed Relevance Ranking model and Notification Click probability (pClick) model. The generated deep-M2PS embedding feature could further increase the model relevance and improve the user and customer/page experience and promote a better ecosystem. The model could also resolve or partially resolve the cold start problem between entities that didn't have established interactions.

Figure 10:
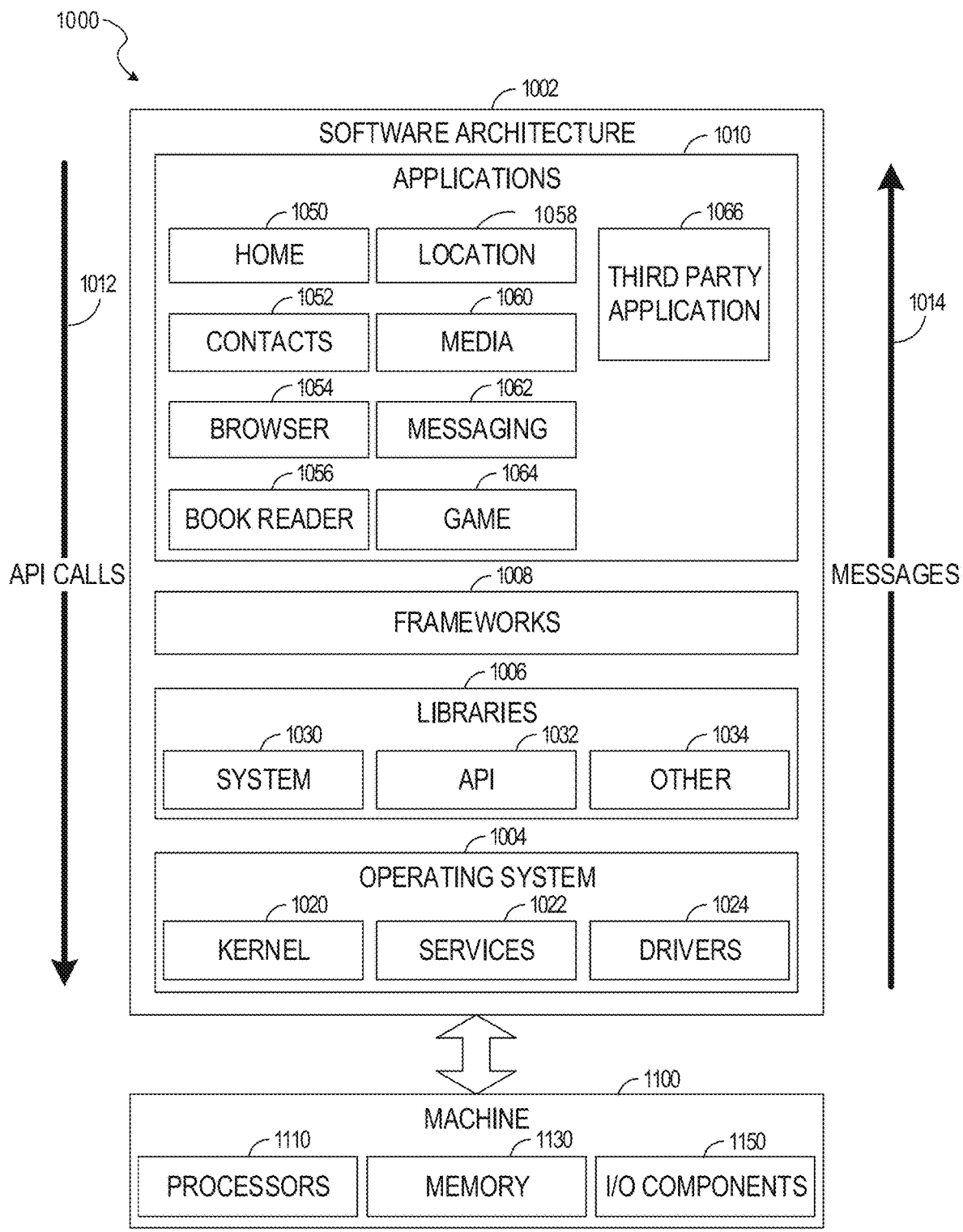
FIG. 10 is a block diagram illustrating an architecture of software, which can be installed on any one or more of the devices described above.

FIG. 10 is a block diagram 1000 illustrating a software architecture 1002, which can be installed on any one or more of the devices described above. FIG. 10 is merely a non-limiting example of a software architecture, and it will be appreciated that many other architectures can be implemented to facilitate the functionality described herein. In various embodiments, the software architecture 1002 is implemented by hardware such as a machine 1100 of FIG. 11 that includes processors 1110, memory 1130, and input/output (I/O) components 1150. In this example architecture, the software architecture 1002 can be conceptualized as a stack of layers where each layer may provide a particular functionality. For example, the software architecture 1002 includes layers such as an operating system 1004, libraries 1006, frameworks 1008, and applications 1010. Operationally, the applications 1010 invoke API calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphical user interface (GUI) functions, high-level resource management, high-level location services, and so forth. The frameworks 1008 can provide a broad spectrum of other APIs that can be utilized by the applications 1010, some of which may be specific to a particular operating system 1004 or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications such as a third-party application 1066. According to some embodiments, the applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1066 can invoke the API calls 1012 provided by the operating system 1004 to facilitate functionality described herein.

Figure 11:
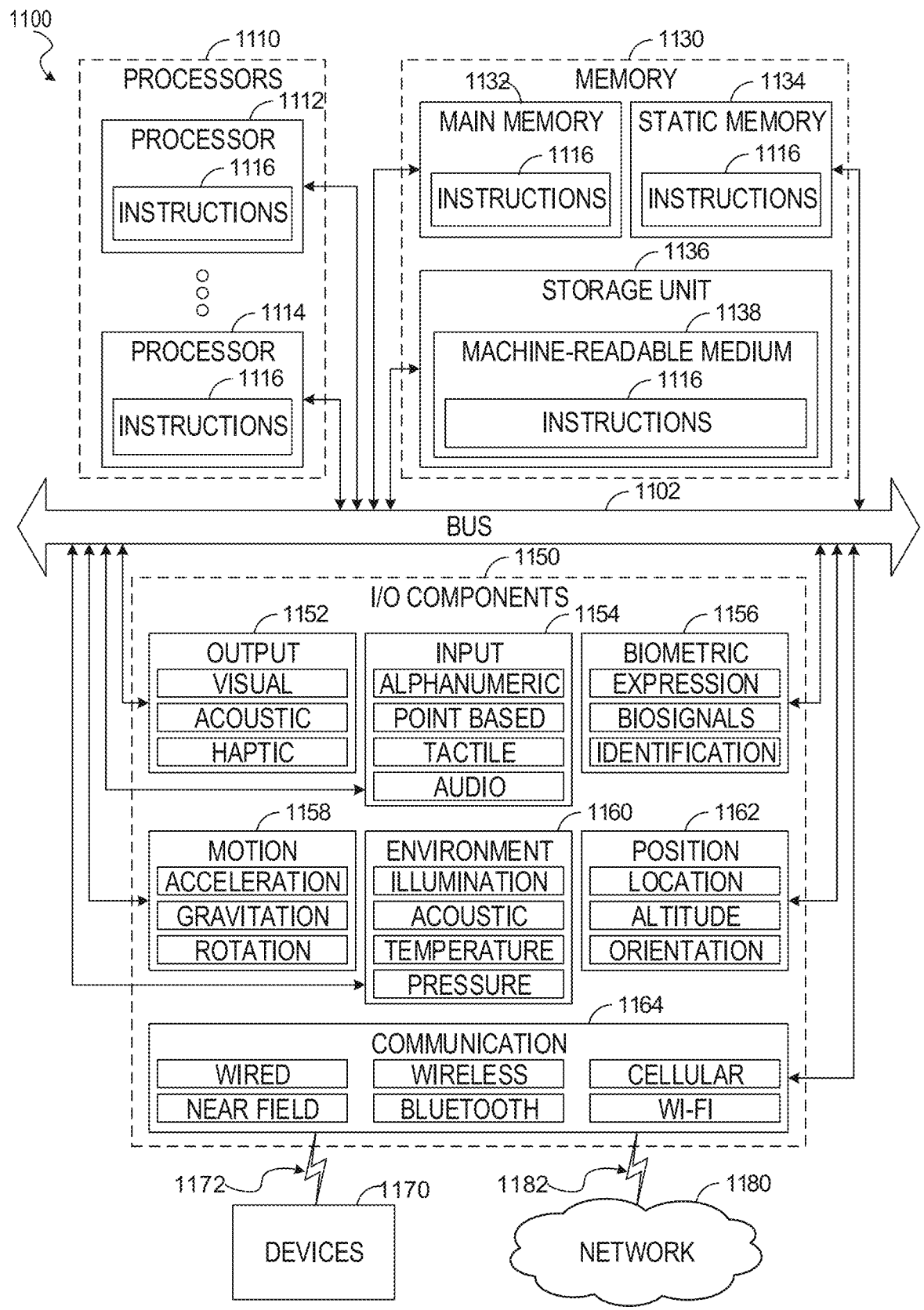
FIG. 11 illustrates a diagrammatic representation of a machine in the form of a computer system within which a set of instructions may be executed for causing the machine to perform any one or more of the methodologies discussed herein, according to an example embodiment.

FIG. 11 illustrates a diagrammatic representation of a machine 1100 in the form of a computer system within which a set of instructions may be executed for causing the machine to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application 1010, an applet, an app, or other executable code) for causing the machine 1100 to perform any one or more of the methodologies discussed herein may be executed. For example, the instructions 1116 may cause the machine 1100 to execute the method 800 of FIG. 8. Additionally, or alternatively, the instructions 1116 may implement FIGS. 1-8, and so forth. The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors that may comprise two or more independent processors (sometimes referred to as "cores") that may execute instructions 1116 contemporaneously. Although FIG. 11 shows multiple processors 1110, the machine 1100 may include a single processor with a single core, a single processor with multiple cores (e.g., a multi-core processor), multiple processors with a single core, multiple processors with multiple cores, or any combination thereof.

The memory 1130 may include a main memory 1132, a static memory 1134, and a storage unit 1136, all accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 may include a wide variety of components to receive input, provide output, produce output, transmit information, exchange information, capture measurements, and so on. The specific I/O components 1150 that are included in a particular machine 1100 will depend on the type of machine 1100. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion, and the grouping is in no way limiting. In various example embodiments, the I/O components 1150 may include output components 1152 and input components 1154. The output components 1152 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1162 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a USB).

Moreover, the communication components 1164 may detect identifiers or include components operable to detect identifiers. For example, the communication components 1164 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1130, 1132, 1134, and/or memory of the processor(s) 1110) and/or the storage unit 1136 may store one or more sets of instructions 1116 and data structures (e.g., software) embodying or utilized by any one or more of the methodologies or functions described herein. These instructions (e.g., the instructions 1116), when executed by the processor(s) 1110, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 1116 and/or data. The terms shall accordingly be taken to include, but not be limited to, solid-state memories, and optical and magnetic media, including memory internal or external to the processors 1110. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1180 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 1116 may be transmitted or received over the network 1180 using a transmission medium via a network interface device (e.g., a network interface component included in the communication components 1164) and utilizing any one of a number of well-known transfer protocols (e.g., HTTP). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
a memory; and
a non-transitory computer-readable medium having instructions stored thereon, which, when executed by a processor, cause the system to perform operations comprising:
accessing data pertaining to a plurality of entities in an online network, the data including information about connections among the entities, the data including information about entities of multiple entity types;
for each entity to which the data pertains:
generating an entity graph indicating the connections between the entity and other entities in the online network;
for each entity in the data that the entity is connected with in the entity graph:
creating a modulo embedding for the entity;
creating a modulo embedding for the entity that the entity is connected with; and
concatenating the modulo embedding for the entity with the modulo embedding for the entity the entity is connected with;
selecting some but not all of the entities as representatives;
creating an anchor embedding using the representatives;
creating a meta-path embedding for each of a plurality of groupings of entities with direct connections with each other or indirect connections between entities of a same entity type up to two hops away from each other in the connections in the entity graph; and
passing the entity graph, the anchor embeddings, and the meta-path embeddings to a deep neural network to train the deep neural network to predict future connections among the entities, the passing including:
passing the entity graph, the anchor embeddings for entities of a first entity type, and meta-path embeddings created from the anchor embeddings of the first entity type to a first tower of the deep neural network; and
passing the entity graph, the anchor embeddings for entities of a second entity type, and meta-path embeddings created from the anchor embeddings of the second entity type to a second tower of the deep neural network.

2. The system of claim 1, wherein the data includes one or more transactional features, each transactional feature including an aggregation of a number of members for each action type in each time window.

3. The system of claim 1, wherein the operations further comprise
performing a dot product of output from the first tower with output of the second tower; and
passing a result of the dot product to a sigmoid layer.

4. The system of claim 3, wherein the first entity type is user and the second entity type is page.

5. The system of claim 1, wherein the selecting includes randomly selecting representatives from entities having the most and/or strongest connections from or with the representatives.

6. The system of claim 1, wherein the selecting includes randomly selecting representatives from each of a plurality of groupings of entities having different levels of connection from or with the representatives.

7. The system of claim 1, wherein the connections include interactions and connections via shared employment.

8. The system of claim 1, wherein the meta-path embedding is an input feature for training data for the deep neural network.

9. The system of claim 1, wherein the creating the meta-path embedding includes treating all connections as being bidirectional.

10. The system of claim 1, wherein the creating the meta-path embedding includes creating a private meta-path embedding and creating a public meta-path embedding.

11. The system of claim 1, wherein the creating the meta-path embedding uses three mean-pool propagation.

12. The system of claim 1, wherein the deep neural network generates two entity embeddings, each with public and private contexts.

13. The system of claim 12, wherein the entity embeddings are used as input features in another machine learning model.

14. A method comprising:
accessing data pertaining to a plurality of entities in an online network, the data including information about connections among the entities, the data including information about entities of multiple entity types;
for each entity to which the data pertains:
generating an entity graph indicating the connections between the entity and other entities in the online network;
for each entity in the data that the entity is connected with in the entity graph:
creating a modulo embedding for the entity;
creating a modulo embedding for the entity that the entity is connected with; and
concatenating the modulo embedding for the entity with the modulo embedding for the entity the entity is connected with;
selecting some but not all of the entities as representatives;
creating an anchor embedding using the representatives;
creating a meta-path embedding for each of a plurality of groupings of entities with direct connections with each other or indirect connections between entities of a same entity type up to two hops away from each other in the connections in the entity graph; and
passing the entity graph, the anchor embeddings, and the meta-path embeddings to a deep neural network to train the deep neural network to predict future connections among the entities, the passing including:
passing the entity graph, the anchor embeddings for entities of a first entity type, and meta-path embeddings created from the anchor embeddings of the first entity type to a first tower of the deep neural network; and
passing the entity graph, the anchor embeddings for entities of a second entity type, and meta-path embeddings created from the anchor embeddings of the second entity type to a second tower of the deep neural network.

15. The method of claim 14, further comprising
performing a dot product of output from the first tower with output of the second tower; and passing a result of the dot product to a sigmoid layer.

16. The method of claim 15, wherein the first entity type is user and the second entity type is page.

17. The method of claim 14, wherein the selecting includes randomly selecting representatives from entities having the most and/or strongest connections from or with the representatives.

18. The method of claim 14, wherein the selecting includes randomly selecting representatives from each of a plurality of groupings of entities having different levels of connection from or with the representatives.

19. The method of claim 14, wherein the connections include interactions and connections via shared employment.

20. A system comprising:
means for accessing data pertaining to a plurality of entities in an online network, the data including information about connections among the entities, the data including information about entities of multiple entity types;
means for, for each entity to which the data pertains:
generating an entity graph indicating the connections between the entity and other entities in the online network;
means for, for each entity in the data that the entity is connected with in the entity graph:
creating a modulo embedding for the entity;
creating a modulo embedding for the entity that the entity is connected with; and
concatenating the modulo embedding for the entity with the modulo embedding for the entity the entity is connected with;
selecting some but not all of the entities as representatives;
creating an anchor embedding using the representatives;
creating a meta-path embedding for each of a plurality of groupings of entities with direct connections with each other or indirect connections between entities of a same entity type up to two hops away from each other in the connections in the entity graph; and
passing the entity graph, the anchor embeddings, and the meta-path embeddings to a deep neural network to train the deep neural network to predict future connections among the entities, the passing including:
passing the entity graph, the anchor embeddings for entities of a first entity type, and meta-path embeddings created from the anchor embeddings of the first entity type to a first tower of the deep neural network; and
passing the entity graph, the anchor embeddings for entities of a second entity type, and meta-path embeddings created from the anchor embeddings of the second entity type to a second tower of the deep neural network.

* * * * *

UNITED STATES PATENT AND TRADEMARK OFFICE
CERTIFICATE OF CORRECTION

PATENT NO. : 11,941,057 B2
APPLICATION NO. : 17/830067
DATED : March 26, 2024
INVENTOR(S) : Liu et al.

Page 1 of 1

It is certified that error appears in the above-identified patent and that said Letters Patent is hereby corrected as shown below:

In the Claims

In Column 19, Line 10, in Claim 5, delete "and/or" and insert --or-- therefor

In Column 20, Line 11, in Claim 15, after "and", insert a linebreak

Signed and Sealed this
Fourteenth Day of May, 2024

Katherine Kelly Vidal
*Director of the United States Patent and Trademark Office*